United States Patent
Kerschner et al.

(10) Patent No.: US 8,387,221 B2
(45) Date of Patent: Mar. 5, 2013

(54) DEVICE AND METHOD FOR FINISHWORKING OF A FORMING TOOL FOR AN AUTO BODY SHEET METAL PART

(75) Inventors: Matthias Kerschner, Rohrbach (DE); Hubert Waltl, Baar-Ebenhausen (DE); Martin Hoernig, Ohorm (DE); Nadine Mueller, Munich (DE)

(73) Assignee: Audi AG, Ingolstadt (DE)

( * ) Notice: Subject to any disclaimer, the term of this patent is extended or adjusted under 35 U.S.C. 154(b) by 1037 days.

(21) Appl. No.: 12/172,837

(22) Filed: Jul. 14, 2008

(65) Prior Publication Data

US 2009/0038139 A1   Feb. 12, 2009

(51) Int. Cl.
*B23P 23/00* (2006.01)

(52) U.S. Cl. ... 29/33 R; 29/56.5; 29/407.05; 29/402.06; 29/402.18; 451/6; 76/107.1

(58) Field of Classification Search ............ 409/201, 409/211, 216, 186, 188, 193, 195, 207, 79–80; 451/6; 29/407.01, 407.05, 402.04, 402.05, 29/402.06, 402.18, 33 R, 564, 56.5, 33 A; 76/107.1, 107.4
See application file for complete search history.

(56) References Cited

U.S. PATENT DOCUMENTS

| | | | | |
|---|---|---|---|---|
| 3,172,209 | A | * | 3/1965 | Reichart ........................ 33/551 |
| 3,636,797 | A | * | 1/1972 | Moore ......................... 76/107.1 |
| 2009/0044585 | A1 | * | 2/2009 | Kerschner et al. ................ 72/57 |

FOREIGN PATENT DOCUMENTS

| | | | |
|---|---|---|---|
| DE | 4311154 A1 | * | 11/1994 |
| DE | 43 11 154 C2 | | 2/1996 |
| DE | 101 03 555 A1 | | 8/2002 |
| DE | 10103555 A1 | * | 8/2002 |
| DE | 102006008189 B3 | * | 4/2007 |
| WO | WO 2007/087867 A1 | * | 8/2007 |

* cited by examiner

*Primary Examiner* — Erica E Cadugan

(74) *Attorney, Agent, or Firm* — Novak Druce Connolly Bove & Quigg LLP

(57) ABSTRACT

The invention relates to a device for finishworking of a forming tool for an auto body sheet metal part in which, in a first working step for identifying a surface region of a tool surface to be remachined, a sheet metal part which has been coated with a marking paint can be formed in a pressing process by means of the tool and, using the color impression of the sheet metal part on the tool surface, the surface region which is to be remachined is acquired, and then in a second working step the surface region to be remachined can be remachined by a corresponding surface treatment. According to the invention, the device has a machining apparatus which electronically acquires the tool surface with the color impression and, depending on the intensity of the color impression, determines the location and/or dimension of the surface area to be remachined and remachines it accordingly.

7 Claims, 3 Drawing Sheets

DEVICE AND METHOD FOR FINISHWORKING OF A FORMING TOOL FOR AN AUTO BODY SHEET METAL PART

CROSS-REFERENCE TO RELATED APPLICATIONS

This application claims priority from German Patent Application No. 10 2006-001712.9 filed Jan. 13, 2006.

The invention relates to a device and method for finishworking of a forming tool for an auto body sheet metal part.

BACKGROUND OF THE INVENTION

In the production of deep drawing tools for auto body sheet metal parts, in general concluding finishworking or remachining of the tool surfaces is done to avoid overly high local surface pressure per unit area of the auto body sheet metal part. Such an overly high surface pressure can produce cracks in the auto body sheet metal part.

Therefore, for example, for concluding finishworking of the tool surfaces in a so-called spotting process, the regions of the tool surface which are to be remachined are identified and then removed, for example, by scraping or grinding.

Thus, for example, DE 43 11 154 C2 discloses a generic device and a method in which in a first working step for identifying a region of a tool surface to be remachined a sheet metal part is first painted with marking paint. The sheet metal part is inserted into the spotting press and pressed or deep-drawn between two tool halves of the tool. Using the color impression of the spotted sheet metal part on the respective tool surface the surface regions with overly high surface pressure per unit area can be identified. I.e., surface regions with a color impression of high color intensity apply an overly high surface pressure and must therefore be remachined in a second working step by corresponding surface working.

For efficient use of a spotting press, finishworking of the identified tool surface regions is done outside the spotting press. In this way the occupancy of the spotting press is limited to the actual spotting process to save time. The tool surface after the spotting process is, however, further machined by scraping or grinding in manual finishworking. This surface treatment is on the one hand time-consuming. On the other hand, the working of the identified surface regions, in particular vertical removal, is subject to the subjective assessment of the respective operator.

DE 199 15 758 A1 conversely discloses a method for producing a tool in which the structure of the tool is determined computer-supported proceeding from the desired geometry of the finished workpiece, without a spotting process, using geometrical computations, and the tool can be produced. A tool which has been produced in this way is checked and optionally remachined with the aforementioned spotting process.

The object of the invention is to make available a device and a method in which finishworking of the forming tool for an auto body sheet metal part can be efficiently carried out.

SUMMARY OF THE INVENTION

According to the invention, the device has a machining apparatus which electronically acquires the tool surface with the color impression and depending on the color intensity of the color impression determines the location and/or dimension of the surface region to be remachined and remachines it accordingly. In this way finishworking which previously was done in a time-consuming and expensive manner in manual activity according to the invention is carried out in an automated working process.

According to the invention, the machining apparatus has an analysis unit which preferably optically acquires the tool surface together with the color impression and produces from it the respective image data of the tool surface.

Remachining of the identified surface regions to be remachined can be done, for example, by removal by means of a laser, by eroding, belt grinding or by grinding with a flexible grinding disk.

According to an embodiment of the invention, the machining apparatus can have an analysis unit which preferably optically acquires the tool surface with the color impression and produces image data of the tool surface from it. By means of the image data of the tool surface which have been produced by the analysis unit, said tool surface can be electronically evaluated and/or further machined.

In this connection, according to another embodiment it is advantageous if, for delineation of the identified surface region to be remachined, the analysis unit determines the peripheral edge of the surface region to be remachined. Determination of the peripheral edge can be done preferably by means of color identification in which the peripheral edge of the surface to be remachined is determined based on different color intensities.

According to a still further embodiment, the machining apparatus or analysis unit for image acquisition has a corresponding means, such as a digital camera which photographs the tool surface at least in one view and generates a three-dimensional model of the tool surface by means of the image data produced from it. Preferably the digital camera can photograph the tool surface in a plurality of views from different perspectives so that the three-dimensional model of the tool surface can be prepared with a correspondingly greater degree of accuracy.

According to another aspect of the invention, the machining apparatus can determine the necessary material removal depending on the intensity of the color impression on the surface region to be remachined. Based on this determined necessary material removal, the tool surface can be remachined geometrically-true in a time-saving manner in the subsequent remachining process.

If according to another embodiment the tool consists of a top part and a bottom part which are mounted in a respective deep drawing press, the machining apparatus preferably can acquire the two opposite tool surfaces with the respective color impression. In this way, the surface regions with overly high surface pressure are identified at the same time on the opposing tool surfaces in one press process. According to the invention the analysis unit can superimpose the image data of the color impression of the first tool surface and of the color impression of the second tool surface on one another. Using the amount of intersection formed therefrom the analysis unit can determine the surface region to be remachined. I.e., the surface regions of the respective tool surfaces which have high color intensity and which intersect form an intersection region which the analysis unit establishes as a region to be remachined. This intersection region is especially relevant to subsequent remachining since here the sheet metal part is loaded on both sides with overly high surface pressure and thus is formed with especially small sheet metal thickness.

According to a further embodiment, the machining apparatus can have a control unit which produces a movement program for a handling unit using the location and dimension of the surface region to be remachined which have been acquired by the analysis unit. Based on this movement program the handling unit can remachine the respective tool surface. Thus, by means of the analysis unit, the control unit and the handling unit, a controlled system is provided for which acquisition, evaluation and remachining take place automatically.

In this connection, in a still further embodiment, in an evaluation step the control unit can compare the color impression of the tool surface which has been acquired as the actual state by the analysis unit to a stored theoretical state and based on this comparison can identify the surface region and can route the corresponding control signals to the handling unit.

According to another embodiment, the machining apparatus or its control unit can determine for an essentially uniform color distribution of the color impression acquired by an analysis unit—i.e. the surface pressure is essentially constantly distributed over the tool surface—that subsequent remachining is not necessary and thus can end the finishworking process. Alternatively, the finishworking process can be ended when the control unit establishes essential agreement of the color impression of the tool surface which has been acquired as the actual state with the stored theoretical state.

According to a further embodiment, the machining apparatus after completed remachining of the tool surface can again acquire another color impression of a finished sheet metal part on the tool surface and optionally can carry out pertinent finishworking. In this way the remachining process can be iteratively carried out until the result, i.e., for example, a color impression with a uniform color intensity, is achieved.

According to a still further embodiment, the handling means can be made as an industrial robot which is positioned preferably directly on a deep drawing press assigned to the tool. In this way, the deep drawing tool can be directly finishworked in the press without the necessity of dismounting the tool from the press.

According to another aspect of the invention, for reasons of space and for exact acquisition of image data it is advantageous if an image acquisition means, such as a digital camera, and/or an illumination means which illuminates the tool surface during image acquisition is carried by the industrial robot.

The control section which consists of the analysis unit, the control unit and the handling unit according to an embodiment of the invention can be expanded by an additional application unit which automatically applies marking paint to the sheet metal part. Thus application of marking paint to the sheet metal part is also automated.

According to another embodiment of the invention, in particular the finishworking device can execute a corresponding process for finishworking of the forming tool, whereby first the color impression on the tool surface is electronically acquired and then depending on the intensity of the color impression the location and/or dimension of the surface region to be remachined is determined and is remachined accordingly.

DETAILED DESCRIPTION OF THE PREFERRED EMBODIMENTS OF THE INVENTION

Figure 1:
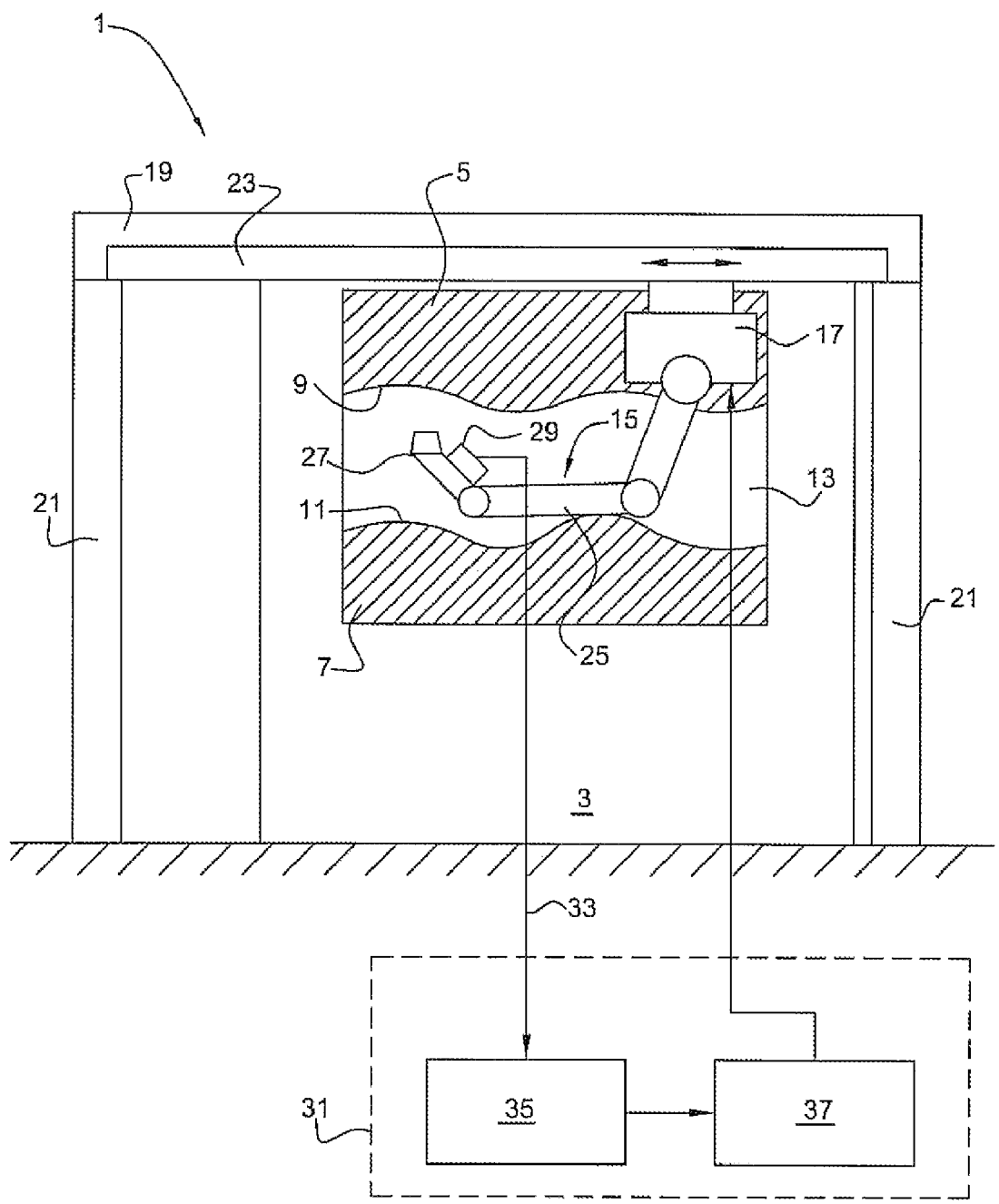
FIG. 1 shows in a schematic a device for finishworking of a forming tool for an auto body sheet metal part.

FIG. 1 shows a device 1 for finishworking of a forming tool for an auto body sheet metal part and the assigned deep drawing press 3. The deep drawing press 3 is formed with a deep drawing tool consisting of a top part 5 and bottom part 7. The tool parts 5, 7 are spaced apart from one another with their respective tool surfaces 9, 11 over a free space 13. For a pressing process a sheet metal part is to be inserted into the free space 13 of the press 3 and the upper part 5 of the tool is pressed with a given contact pressure against the bottom part 7 of the tool.

As shown in FIG. 1, the finishworking device 1 is located directly in front of the press 3. The former in particular has an industrial robot 15 which is mounted over the base part 17 in a suspended version on a cross member 19. The cross member 19 is in turn supported on its end sides by way of columns 21 on the floor. The base part 17 of the industrial robot 15 is made with a drive unit via which the base part 17 can be moved back and forth in the direction of the arrow along the linear guide 23 of the cross member 19. In addition, a robot arm 25 is pivoted on the base part 17 of the robot which is made with three arms which are each coupled to one another by way of joints. On the free end of the robot arm 25 it has a grinder unit 27 with which the respective tool surfaces 9, 11 can be remachined. In addition, on the free end of the robot arm 25 an image acquisition means 29, such as a digital camera, with the corresponding illumination means, is suggested in a broken line. The grinder unit 27 and the image acquisition unit 29 can be mounted depending on installation conditions on the free end of the robot arm 15 either jointly or alternating depending on the working step to be executed.

As shown in FIG. 1, the image acquisition unit 29 is part of the machining apparatus 31 and is coupled to it via a signal line 33. The machining apparatus 31 consists of an analysis unit 35 to which the image acquisition unit 29 is assigned. The analysis unit 35 acquires the signals of the image acquisition unit 29 and produces the respective image data of the respective tool surface 9, 11 which has been photographed by the image acquisition unit 29. The image data of the tool surfaces 9, 11 produced in this way are relayed to a control unit 37 of the machining apparatus 31 which, based on the image data, routes the control signals to a handling unit, i.e., an industrial robot 15. Depending on these control signals the industrial robot 15 with its grinder unit 27 works the respective tool surface 9, 11.

Figure 2:
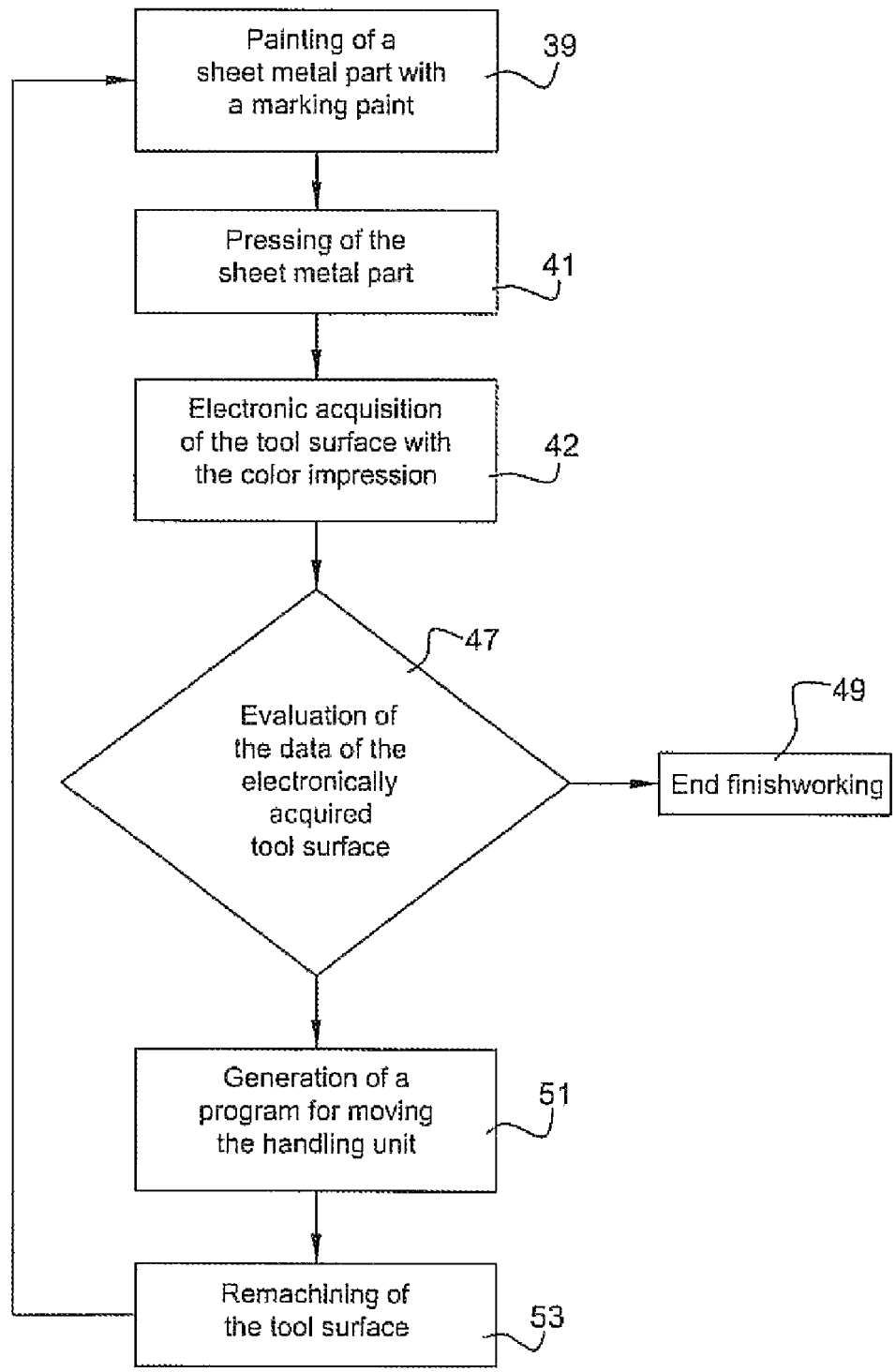
FIG. 2 shows in a flow chart the process for finishworking of the forming tool.

FIG. 2 shows the method of finishworking of the tool surfaces 9, 11 of the tool parts 5, 7 in a flow chart. First, in a working step 39 a sheet metal part which is not shown in FIG. 1 is painted with a marking paint. The marking paint can be applied to the sheet metal part manually or automatically by means of an application unit. Then, in a working step 41 the spotted sheet metal part is inserted between the upper part 5 of the tool and the lower part 7 of the tool of the press 3 and a pressing process is started. After completion of the process, a color impression of the spotted sheet metal part, as is shown in FIG. 3, can be detected on the respective tool surfaces 9, 11.

Figure 3:
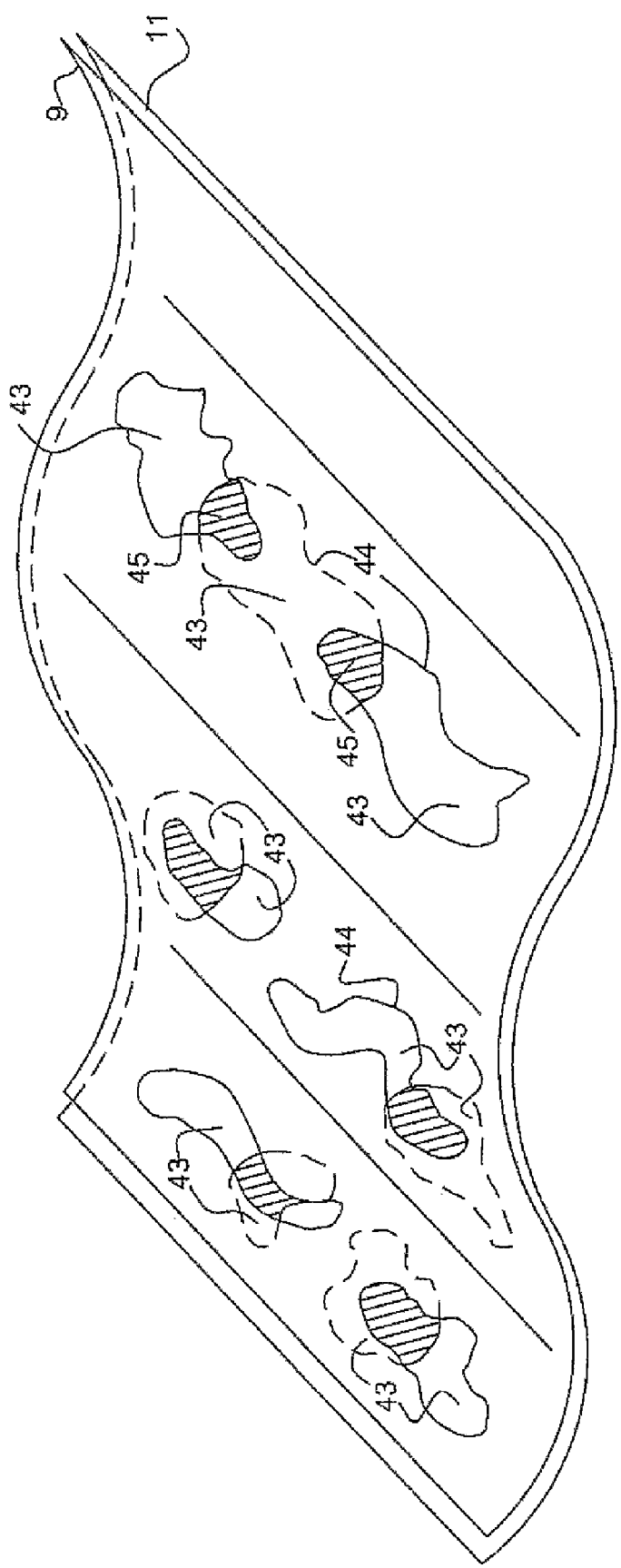
FIG. 3 shows corresponding tool surfaces of the upper part of the tool and the lower part of the tool which are superimposed on one another.

FIG. 3 shows the corrugated tool surface 9 of the upper part 5 of the tool and the corresponding tool surface 11 of the lower part 7 of the tool placed on top of one another. The two tool surfaces 9, 11 after the deep drawing process each have color impressions, of which the surface regions 43 are shown in FIG. 3 with high color intensity. FIG. 3 shows the surface regions 43 of the tool surface 11 by a broken line.

According to FIG. 2, in a working step 42 the analysis unit 35 generates three-dimensional models of the tool surfaces 9, 11 using the image data obtained from the image acquisition unit 29 and superimposes the surface regions 43 with high color intensity on the respective tool surfaces 9, 11. In the process the analysis unit 35 delineates the respective surface region 43 with a peripheral edge curve 44 in order to accurately represent the respective surface region 43 of high color intensity. For the surface regions 43 with high color intensity, the preceding deep drawing process took place with overly high surface pressure.

Using the superimposed surface regions 43, the analysis unit 35 identifies the intersecting regions 45 shown cross-hatched in FIG. 3 as the surface regions to be remachined. The intersecting regions 45 show the locations at which the sheet metal part is loaded on both sides with overly high surface pressure and therefore is especially thin-walled.

In another working step 47 the control unit 37 evaluates the image data of the analysis unit 35. The control unit 37 can compare for evaluation purposes the color impression of the tool surfaces 9, 11 which are acquired as the actual state to the stored theoretical state and can decide on this basis which surface regions must be remachined. In the event that the control unit 37 in the working step 47 establishes an essentially uniform color distribution of the color impression of the respective tool surfaces 9, 11, the control unit 37 ends the finishworking process according to the working step 49. If the control unit 37 conversely determines an intersection region 45 as shown in FIG. 3, the control unit 37 in a working step 51 generates a program for moving the industrial robot 15 using the acquired image data. Then the control unit 37 routes the corresponding control signals to the base part 17 of the robot 15 which in working step 53 remachines the intersecting region 45 of the two tool surfaces 9, 11.

Following this remachining process, according to a working step 53, the working steps 39 to 53 which are described using FIG. 2 are again iteratively carried out until the control unit 37 ascertains in a working step 47 that the actual state which has been acquired using the color impressions substantially agrees with the stored theoretical state. In this case the finishworking process is ended according to working step 49.

The invention claimed is:

1. An apparatus for reforming at least one of a plurality of forming surfaces of a set of forming tools of a machine operable in press-forming sheet metal parts, comprising:
    means for optically scanning said forming surfaces following the insertion of a sheet provided with a transferable marking substance on at least one side of said sheet, between said forming surfaces, and the closing of said set of forming tools so as to impart said marking substance on portions of said forming surfaces;
    means responsive to reflected optical signals generated by said scanning means for mapping marking substances imparted on said forming surfaces; and
    means for guiding a tool for removing marked portions of said forming surfaces designated by said mapping means;
    wherein said tool guiding means includes a robot, and
    wherein said optical scanning means includes means for illuminating said forming surfaces and includes a digital camera for detecting illumination emanating from said marked substance, mounted on said robot.

2. An apparatus according to claim 1 wherein said mapping means is functional for producing three dimensional models of said forming surfaces.

3. An apparatus according to claim 1 wherein said guiding means is functional to position said removing tool sufficiently for removal of portions of said forming surfaces corresponding to scanned signals having a magnitude indicative of imparted portions of said marking substances.

4. An apparatus according to claim 1 wherein said forming surfaces are cooperating forming surfaces, and said scanning means is functional in scanning said cooperating forming surfaces, said mapping means is functional in mapping marking substances imparted on said cooperating forming surfaces and said guiding means is functional in guiding said tool for removing marked portions of at least one of said surfaces.

5. An apparatus according to claim 1 wherein said guiding means is functional to vary the cutting depth of material removal as a function of the intensity of the reflected optical signal scanned from said marked substances.

6. An apparatus according to claim 1 wherein said set of forming tools includes opposed forming surfaces and said transferable marking substance is applied to opposite sides of said insertable sheet.

7. An apparatus according to claim 6 wherein said mapping means senses overlapping portions of marking substances applied to said sides of said sheet.

* * * * *